(12) United States Patent
Lin et al.

(10) Patent No.: US 12,147,283 B2
(45) Date of Patent: Nov. 19, 2024

(54) RECEIVER DETECTION SYSTEM AND RECEIVER DETECTION DEVICE

(71) Applicant: REALTEK SEMICONDUCTOR CORPORATION, Hsinchu (TW)

(72) Inventors: Yun-Hsien Lin, Hsinchu (TW); Bo-Kai Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 53 days.

(21) Appl. No.: 18/097,350

(22) Filed: Jan. 16, 2023

(65) Prior Publication Data

US 2023/0236647 A1   Jul. 27, 2023

(30) Foreign Application Priority Data

Jan. 25, 2022  (TW) .................................. 111103130

(51) Int. Cl.
| | |
|---|---|
| *G06F 1/00* | (2006.01) |
| *G06F 1/28* | (2006.01) |
| *G06F 1/3296* | (2019.01) |
| *G06F 1/30* | (2006.01) |

(52) U.S. Cl.
CPC .............. *G06F 1/28* (2013.01); *G06F 1/3296* (2013.01); *G06F 1/30* (2013.01)

(58) Field of Classification Search
CPC .......... G06F 1/28; G06F 1/3296; G06F 1/189; G06F 1/26; G06F 13/4072; Y02D 10/00
USPC ........................................................ 713/340
See application file for complete search history.

(56) References Cited

U.S. PATENT DOCUMENTS

| | | | |
|---|---|---|---|
| 6,236,242 B1* | 5/2001 | Hedberg | H03F 3/45479 327/66 |
| 7,376,531 B1* | 5/2008 | Pham | G06F 13/4086 702/127 |
| 8,489,781 B1* | 7/2013 | An | G06F 13/4295 320/137 |

(Continued)

OTHER PUBLICATIONS (1) OA letter of a counterpart TW application (appl. No. 111103130) mailed on Aug. 12, 2022. (2) Summary of the TW OA letter in regard to the TW counterpart application: (1) Claims 1-10 are rejected as being unpatentable over the cited reference 1 (US 2015/0120973 A1) in view of the cited reference 2 (US 2021/0055963 A1).

*Primary Examiner* — Volvick Derose
(74) *Attorney, Agent, or Firm* — WPAT, P.C

(57) ABSTRACT

A receiver detection system includes a media access control (MAC) circuit, a common-mode voltage detector, and a receiver detector. The common-mode voltage detector is configured to detect whether a common-mode voltage satisfies a voltage condition, and to send a ready signal to the receiver detector after the common-mode voltage satisfies the voltage condition. The receiver detector is configured to start a detection process according to the ready signal and a detection start signal from the MAC circuit. In the detection process, the receiver detector sends out a detection signal for detecting whether a receiver exists, and then outputs a detection result to the MAC circuit, wherein the detection result indicates whether the receiver exists. The receiver detection system can prevent the receiver detector from starting the detection process before the common-mode voltage satisfies the voltage condition.

18 Claims, 2 Drawing Sheets

(56) References Cited

U.S. PATENT DOCUMENTS

| | | | |
|---|---|---|---|
| 10,853,295 B2* | 12/2020 | Pan | G06F 13/4022 |
| 2004/0119495 A1* | 6/2004 | Grillo | H04L 25/085 |
| | | | 326/21 |
| 2005/0104623 A1* | 5/2005 | Guo | H04L 25/0274 |
| | | | 326/82 |
| 2006/0230211 A1* | 10/2006 | Woodral | G06F 13/423 |
| | | | 710/302 |
| 2006/0285803 A1* | 12/2006 | Crews | G02B 6/43 |
| | | | 385/88 |
| 2009/0323830 A1* | 12/2009 | Shim | H04L 5/20 |
| | | | 326/86 |
| 2014/0254650 A1* | 9/2014 | Bergkvist, Jr. | H04B 17/104 |
| | | | 375/224 |
| 2014/0317432 A1* | 10/2014 | Rao | H03L 7/0802 |
| | | | 713/340 |
| 2015/0120973 A1* | 4/2015 | Zhang | H04B 10/278 |
| | | | 710/313 |
| 2017/0123470 A1* | 5/2017 | Srivastava | G06F 1/266 |
| 2020/0036369 A1* | 1/2020 | Lee | G06F 1/10 |
| 2020/0328761 A1* | 10/2020 | Lin | H04B 1/0458 |
| 2021/0048876 A1* | 2/2021 | Helfrich | G06F 13/4022 |
| 2021/0055963 A1* | 2/2021 | An | H04L 12/10 |
| 2022/0326885 A1* | 10/2022 | Jeon | G06F 3/0625 |
| 2022/0327074 A1* | 10/2022 | Jeon | G06F 1/3275 |
| 2023/0236647 A1* | 7/2023 | Lin | G06F 1/3296 |
| | | | 713/340 |
| 2024/0014750 A1* | 1/2024 | Haruna | H02P 23/14 |

* cited by examiner

RECEIVER DETECTION SYSTEM AND RECEIVER DETECTION DEVICE

BACKGROUND OF THE INVENTION

1. Field of the Invention

The present disclosure relates to a detection system and device, especially to a detection system and device for detecting whether a receiver exists.

2. Description of Related Art

According to the Peripheral Component Interconnect Express (PCIe) protocol or the Universal Serial Bus (USB) protocol, if a transmitter is idle, the transmitter will enter a suspend state to save power, and the common-mode voltage of the transmitter (i.e., the sum of two complementary signals of a differential signal of the transmitter) will decrease to zero volt (0V); and if the transmitter is waked up, the transmitter will leave the suspend state and enter a resume state, and the common-mode voltage of the transmitter will increase from 0V to $$\frac{V_{DD}}{2}.$$

After the common-mode voltage starts increasing, the transmitter sends out a detection signal for detecting whether a receiver coupled to the transmitter exists.

In practice, the time for the common-mode voltage climbing from 0V to $$\frac{V_{DD}}{2}$$

(hereinafter referred to as "the climbing time") is under the influence of the impedance (e.g., resistance and capacitance) of an external printed circuit board (PCB) and under the influence of the length of a transmission cable, if any; and both the PCB and the transmission line are between the transmitter and the receiver. For different PCB impedances and cable lengths, the climbing time could be between a minimum climbing time (e.g., dozens of nanoseconds) and a maximum climbing time (e.g., several milliseconds), wherein the difference between the minimum climbing time and the maximum climbing time is significant. In a circumstance that the climbing time approaches the maximum climbing time, the transmitter is likely to send out the detection signal before the common-mode voltage increases to $$\frac{V_{DD}}{2},$$

and in this case the transmitter will probably obtain an incorrect detection result.

In order to deal with the aforementioned uncertain climbing time, a current solution makes a media access control (MAC) circuit of the transmitter delay the time for the transmitter sending out the detection signal and thereby ensures that the common-mode voltage can increase to $$\frac{V_{DD}}{2}$$

in time. However, if the MAC circuit delays the time for the transmitter sending out the detection signal regardless of the actual length of the climbing time, the time for the transmitter leaving the suspend state and entering the resume state will increase without exception, and this will lead to the degradation of performance.

SUMMARY OF THE INVENTION

An object of the present disclosure is to provide a receiver detection system and a receiver detection device that can prevent the problems of the prior art.

An embodiment of the receiver detection system of the present disclosure includes a media access control (MAC) circuit, a common-mode voltage detector, and a receiver detector. The common-mode voltage detector is configured to detect whether a common-mode voltage satisfies a voltage condition, and to send a ready signal to the receiver detector after the common-mode voltage satisfies the voltage condition. The receiver detector is configured to start a detection process according to the ready signal and a detection start signal of the MAC circuit. In the detection process, the receiver detector sends out a detection signal for detecting whether a receiver exists, and then outputs a detection result to the MAC circuit, wherein the detection result indicates whether the receiver exists.

In regard to the above embodiment, the voltage condition includes at least one of the following: the common-mode voltage being not lower than 70% of a standard common-mode voltage; the common-mode voltage being not higher than 130% of the standard common-mode voltage; and the standard common-mode voltage being equal to 50% of a power supply voltage.

An embodiment of the receiver detection device of the present disclosure includes the above-mentioned common-mode voltage detector and the receiver detector without the MAC circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a receiver detection system and a receiver detection device. The system and device can prevent a receiver detector from untimely detecting whether a receiver exists and thereby prevent the receiver detector from generating an incorrect detection result.

Figure 1:
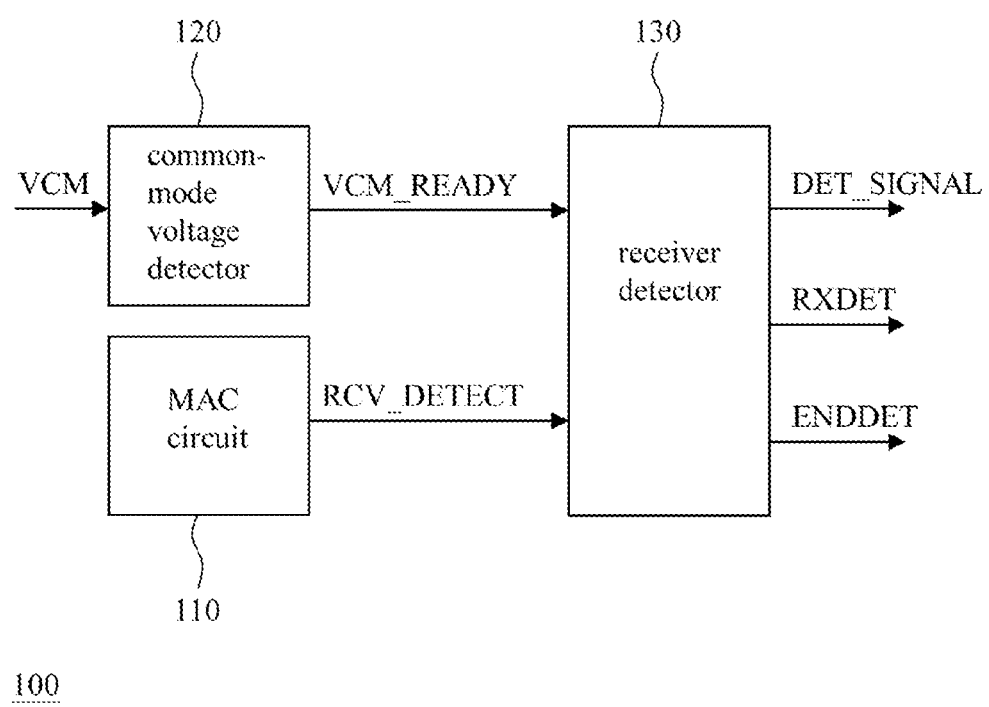
FIG. 1 shows an embodiment of the receiver detection system of the present disclosure.

FIG. 1 shows an embodiment of the receiver detection system of the present disclosure. The receiver detection system 100 of FIG. 1 includes a media access control (MAC) circuit 110, a common-mode voltage detector 120, and a receiver detector 130.

In regard to the embodiment of FIG. 1, the MAC circuit 110 is configured to transmit a detection start signal RCV_DETECT to the receiver detector 130. In an exemplary implementation, the receiver detection system 100 is applied to a transmitter (not shown in FIG. 1) which operates according to a Peripheral Component Interconnect Express (PCIe) protocol or a Universal Serial Bus (USB) protocol. When the transmitter leaves a suspend state and enters a resume state, the MAC circuit 110 transmits the detection start signal RCV_DETECT. It is noted that the receiver detection system 100 can be applied to a device operating according to another kind of protocols, if practicable.

In regard to the embodiment of FIG. 1, the common-mode voltage detector 120 is configured to detect whether a common-mode voltage VCM satisfies a voltage condition, and to send a ready signal VCM_READY to the receiver detector 130 after the common-mode voltage VCM satisfies the voltage condition. In an exemplary implementation, the common-mode voltage detector 120 includes a known/self-developed comparator (not shown in FIG. 1). The comparator is configured to compare the common-mode voltage VCM with at least one predetermined voltage threshold so as to allow the common-mode voltage detector 120 to determine whether the common-mode voltage VCM satisfies the voltage condition. In an exemplary implementation, the common-mode voltage detector 120 includes a known/self-developed analog-to-digital converter (not shown in FIG. 1). The analog-to-digital converter is configured to convert the common-mode voltage VCM into a digital value so that the common-mode voltage detector 120 can ascertain the level of the common-mode voltage VCM according to the digital value and thereby determine whether the common-mode voltage VCM satisfies the voltage condition.

On the basis of the above description, an example of the voltage condition includes at least one of the following: the common-mode voltage VCM reaching a standard common-mode voltage; the common-mode voltage VCM being not lower than 70% of the standard common-mode voltage; the common-mode voltage VCM being not higher than 130% of the standard common-mode voltage; the standard common-mode voltage is 50% of a power supply voltage VDD; and the standard common-mode voltage is the sum of two complementary signals (e.g., the high speed output positive-end signal (HSOp) and the high speed output negative-end signal (HSOn) conforming to the PCIe/USB protocol) of a differential signal of the aforementioned transmitter. It is noted that the voltage condition and the standard common-mode voltage can be determined according to the demand for implementation. It is also noted that the MAC circuit 110 sends out the detection start signal RCV_DETECT at a first time point, the common-mode voltage detector 120 ascertains that the common-mode voltage VCM satisfies the voltage condition at a second time point; and normally, the first time point is earlier than the second time point.

In regard to the embodiment of FIG. 1, the receiver detector 130 is configured to start a detection process according to the detection start signal RCV_DETECT and the ready signal VCM_READY. In the detection process, the receiver detector 130 sends out a detection signal DET_SIGNAL for detecting whether a receiver coupled to the aforementioned transmitter exists, and then outputs a detection result RXDET to the MAC circuit 110, wherein the detection result RXDET indicates whether the receiver exists. For example, if the receiver exists, the detection result RXDET will be a voltage at a first level (e.g., high level), and if the receiver does not exist or cannot be detected, the detection result RXDET will be a voltage at a second level (e.g., low level). It is noted that the receiver detector 130 itself can be configured to determine whether the receiver exists, or the device (e.g., the aforementioned transmitter) including the receiver detector 130 is the one in charge of the detection of the receiver and configured to notify the receiver detector 130 of the detection result RXDET. Since the present disclosure puts emphasis on "when to start the detection process" instead of "how to determine whether the receiver exists", the way to detect the receiver is not explained in detail here.

In an exemplary implementation, the detection process conforms to the PCIe/USB protocol, but the present invention is not limited thereto. In an exemplary implementation, the receiver detector 130 is configured to determine whether the receiver exists and generate the detection signal DET_SIGNAL being a pulse signal, wherein a voltage at a middle of the signal range of the pulse signal is substantially equal to the common-mode voltage VCM. In an exemplary implementation, the detection signal DET_SIGNAL is a notification signal that is used to request the device including the receiver detector 130 to determine whether the receiver exists. In an exemplary implementation, the receiver detector 130 is further configured to send a detection completion signal to the MAC circuit 130 after the detection process finishes, but the present invention is not limited thereto.

Figure 2:
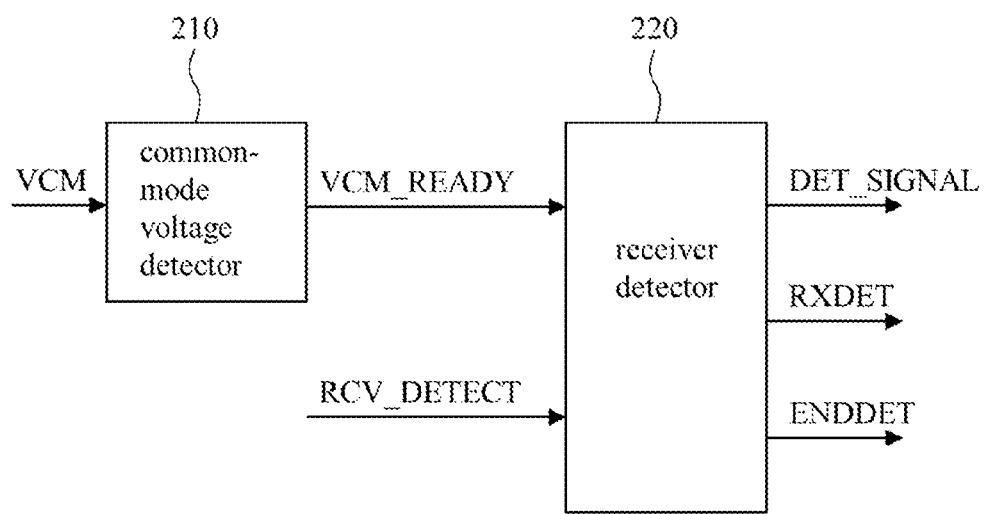
FIG. 2 shows an embodiment of the receiver detection device of the present disclosure.

FIG. 2 shows an embodiment of the receiver detection device of the present disclosure. The receiver detection device 200 of FIG. 2 includes a common-mode voltage detector 210 and a receiver detector 220. An embodiment of the common-mode voltage detector 210 is the common-mode voltage detector 120 of FIG. 1. An embodiment of the receiver detector 220 is the receiver detector 130 of FIG. 1. The detection start signal RCV_DETECT is sent out by a circuit such as the MAC circuit 110 of FIG. 1 or the equivalent thereof. Since those having ordinary skill in the art can refer to the embodiment of FIG. 1 to appreciate the detail and modification of the receiver detection device 200, repeated and redundant description is omitted here.

It should be noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the receiver detection system and device of the present disclosure can prevent the receiver detector from starting the detection process before the common-mode voltage satisfies the voltage condition and thereby prevent the receiver from generating an incorrect detection result.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A receiver detection system comprising a media access control (MAC) circuit, a common-mode voltage detector, and a receiver detector, wherein:

the common-mode voltage detector is configured to detect whether a common-mode voltage satisfies a voltage condition, and configured to send a ready signal to the receiver detector after the common-mode voltage satisfies the voltage condition;

the receiver detector is configured to start a detection process according to the ready signal and a detection start signal of the MAC circuit;

in the detection process, the receiver detector sends out a detection signal for detecting whether a receiver exists, and then outputs a detection result to the MAC circuit, wherein the detection result indicates whether the receiver exists; and the receiver detection system is applied to a transmitter; and after the transmitter enters a resume state from a suspend state, the MAC circuit sends out the detection start signal.

2. The receiver detection system of claim 1, wherein the receiver detector is further configured to send a detection completion signal to the MAC circuit after the detection process finishes.

3. The receiver detection system of claim 1, wherein the voltage condition includes:
the common-mode voltage being not lower than 70% of a standard common-mode voltage.

4. The receiver detection system of claim 3, wherein the voltage condition includes:
the common-mode voltage being not higher than 130% of the standard common-mode voltage.

5. The receiver detection system of claim 3, wherein the standard common-mode voltage is 50% of a power supply voltage.

6. The receiver detection system of claim 3, wherein the standard common-mode voltage is a sum of two complementary signals of a differential signal of a transmitter; and the receiver detection system is applied to the transmitter.

7. The receiver detection system of claim 1, wherein the MAC circuit sends out the detection start signal at a first time point; the common-mode voltage detector ascertains that the common-mode voltage satisfies the voltage condition at a second time point; and the first time point is earlier than the second time point.

8. The receiver detection system of claim 1, wherein the transmitter operates according to a Peripheral Component Interconnect Express (PCIe) protocol or a Universal Serial Bus (USB) protocol.

9. The receiver detection system of claim 1, wherein the detection signal is a pulse signal, and a voltage at a middle of a signal range of the pulse signal is substantially equal to the common-mode voltage.

10. A receiver detection device comprising a common-mode voltage detector and a receiver detector, wherein:
the common-mode voltage detector is configured to detect whether a common-mode voltage satisfies a voltage condition, and configured to send a ready signal to the receiver detector after the common-mode voltage satisfies the voltage condition;

the receiver detector is configured to start a detection process according to the ready signal and a detection start signal of a media access control (MAC) circuit;

in the detection process, the receiver detector sends out a detection signal for detecting whether a receiver exists, and then outputs a detection result to the MAC circuit, wherein the detection result indicates whether the receiver exists; and the receiver detection device is applied to a transmitter; and after the transmitter enters a resume state from a suspend state, the common-mode voltage detector receives the detection start signal.

11. The receiver detection device of claim 10, wherein the receiver detector is further configured to send a detection completion signal to the MAC circuit after the detection process finishes.

12. The receiver detection device of claim 10, wherein the voltage condition includes:
the common-mode voltage being not lower than 70% of a standard common-mode voltage.

13. The receiver detection device of claim 12, wherein the voltage condition includes:
the common-mode voltage being not higher than 130% of the standard common-mode voltage.

14. The receiver detection device of claim 12, wherein the standard common-mode voltage is 50% of a power supply voltage.

15. The receiver detection device of claim 12, wherein the standard common-mode voltage is a sum of two complementary signals of a differential signal of a transmitter; and the receiver detection device is applied to the transmitter.

16. The receiver detection device of claim 10, wherein the common-mode voltage detector receives the detection start signal at a first time point; the common-mode voltage detector ascertains that the common-mode voltage satisfies the voltage condition at a second time point; and the first time point is earlier than the second time point.

17. The receiver detection device of claim 10, wherein the transmitter operates according to a Peripheral Component Interconnect Express (PCIe) protocol or a Universal Serial Bus (USB) protocol.

18. The receiver detection device of claim 10, wherein the detection signal is a pulse signal, and a voltage at a middle of a signal range of the pulse signal is substantially equal to the common-mode voltage.

\* \* \* \* \*